United States Patent [19]

Barnes

[11] 4,157,153
[45] Jun. 5, 1979

[54] ALUMINUM TUBE JOINT DESIGN
[75] Inventor: David A. Barnes, Troup, Tex.
[73] Assignee: General Electric Company, Louisville, Ky.
[21] Appl. No.: 884,524
[22] Filed: Mar. 8, 1978
[51] Int. Cl.² ............................................. B23K 1/08
[52] U.S. Cl. .................................. 228/136; 285/361; 29/432; 29/525
[58] Field of Search ................... 228/135, 136, 173 A, 228/174; 285/22, 360, 361, 376, 401, 402; 29/432, 525

[56] References Cited
U.S. PATENT DOCUMENTS

| | | | |
|---|---|---|---|
| 788,200 | 4/1905 | Finch | 285/402 |
| 1,476,119 | 12/1923 | Van Nagell | 285/361 |
| 2,673,751 | 3/1954 | Finch | 285/361 |
| 3,068,508 | 12/1962 | Heyer | 29/432 |
| 3,803,532 | 4/1974 | Taxon | 285/361 |

Primary Examiner—Lowell A. Larson
Attorney, Agent, or Firm—Frank P. Giacalone; Radford M. Reams

[57] ABSTRACT

The present invention relates to a tube joint and the method of assembling the joints wherein a male member that is dimensioned to be telescoped in a cup portion of a female tube member is provided with projecting nibs that project radially outwardly from the outer surface of the male member. The telescoping action of the members together with a rotational movement of the male member causes the nibs to form a locking groove in the inner surface of the female member that extends longitudinally circumferentially and effectively prevents axial movement of the members relative to each other prior to the soldering operation.

5 Claims, 10 Drawing Figures

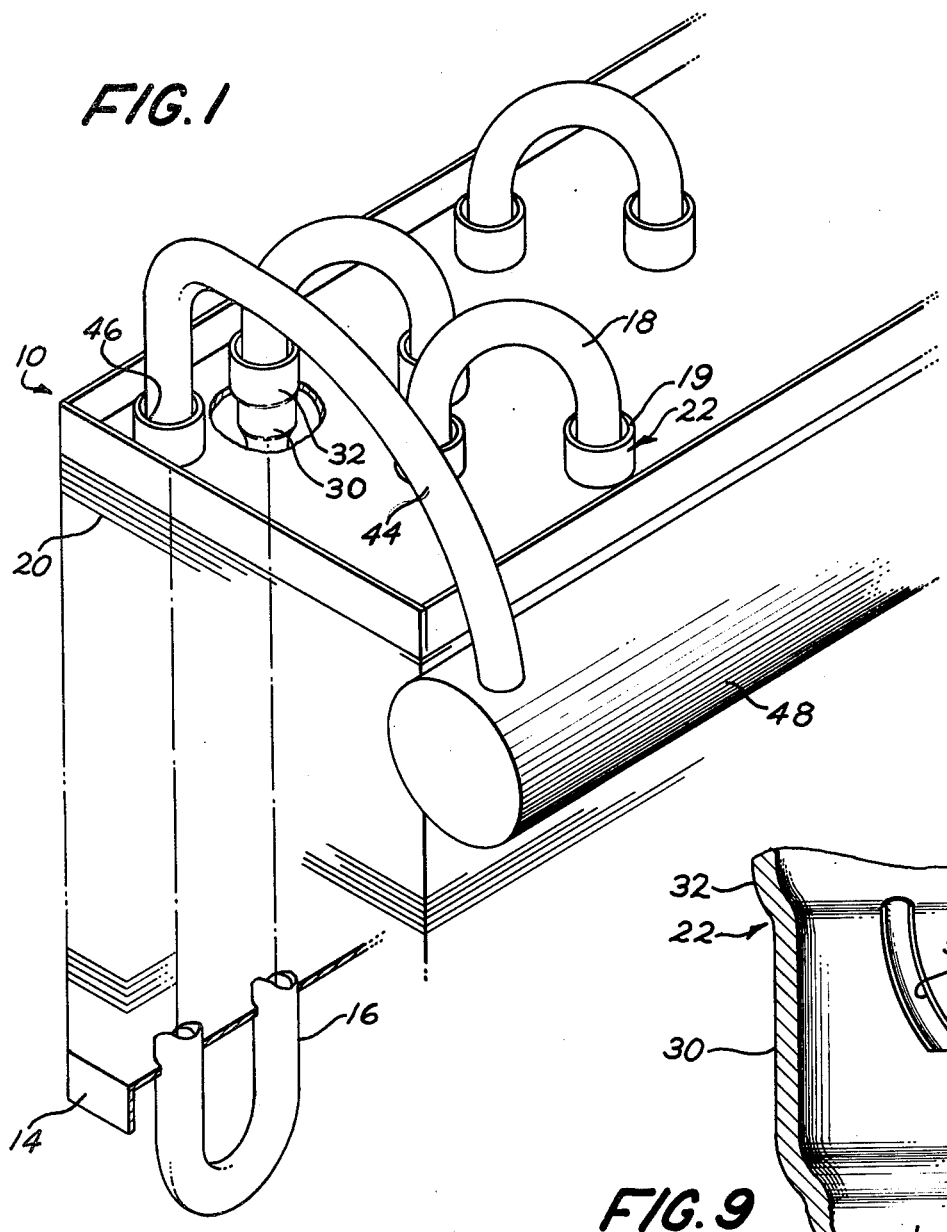
FIG. 1
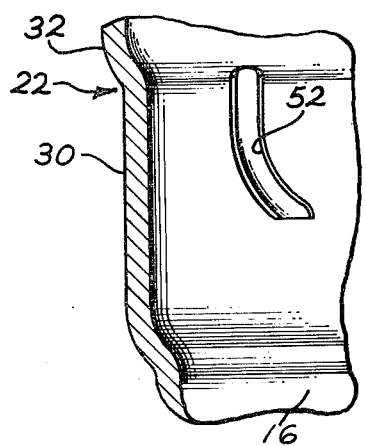
FIG. 10
FIG. 9

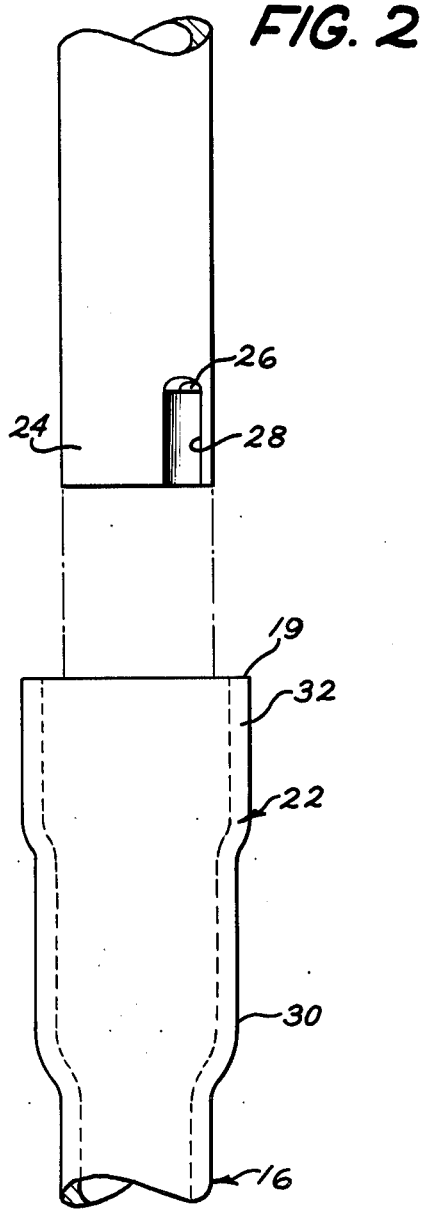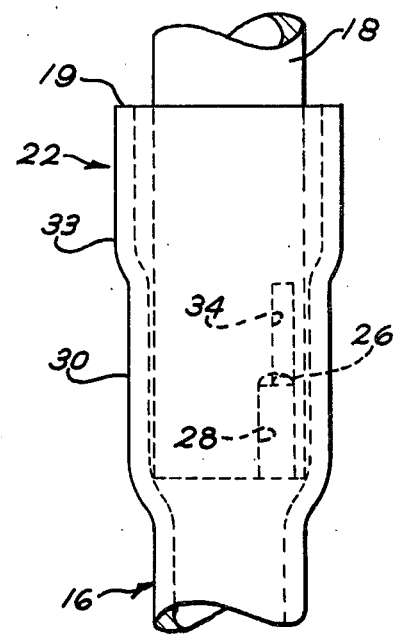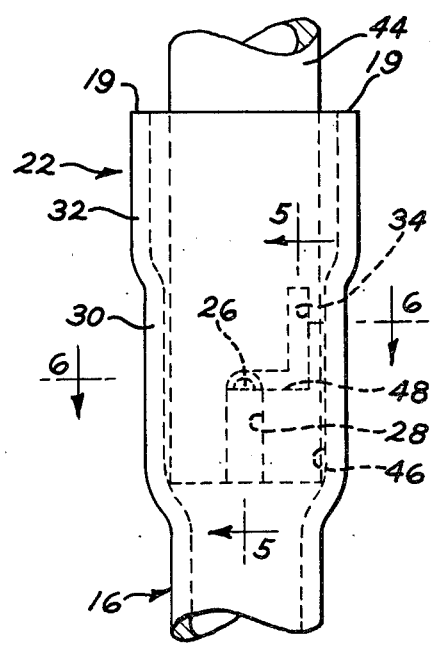

ALUMINUM TUBE JOINT DESIGN

BACKGROUND OF THE INVENTION

The invention relates to the manufacture of fluid tight joints in metal tubing for heat exchangers such as condensers and evaporators use in air conditioning and refrigeration systems. Traditionally, in fabricating aluminum heat exchangers, most of the joints are soldered at one time as by dipping the entire assembly in an ultrasonic solder bath. In employing this method of soldering joints the heat exchangers are turned so that the joints and particularly the return bends to be soldered end up on the bottom of the heat exchangers.

One problem with orienting the heat exchangers for soldering has been that of ensuring that the assembled parts to be soldered do not move relative to each other to the dip soldering operation and the completion of the joint. One attempt at solving this problem has been as shown in U.S. Pat. No. 3,833,986-DeCicco and U.S. Pat. No. 3,957,289-Kilgore et al to provide the male portion of the joint with a plurality of spaced projections or nibs which frictionally engage the inner wall of the female portion of the joint. This system has proven adequate when employed in return bends wherein both ends of the return bend are frictionally held against movement.

However, some difficulties have been encountered when a more complex section of tubing is to be soldered to the heat exchanger, as for example components that require only one end to be attached to the heat exchanger. In many of these instances, when a number is supported at only one of its ends, movement occurs between the memers to be soldered that ultimately results in joints that are not adequately sealed. One system employed is to use fixtures to hold these members while they are being soldered. This has solved the problem but is obviously costly in that special fixtures must be provided for the design configuration of each particular member, and time consuming in that the fixtures must be secured to the member and removed after each soldering operation.

Accordingly, one object of the instant method is to provide a method wherein the members to be joined to the heat exchanger at only one end of their ends are effectively held together in their designed position without the use of externally applied members that are not part of the heat exchanger or refrigeration system.

SUMMARY OF THE INVENTION

By the present invention, metal tube members are joined wherein a female tube member is provided having a flared cup end portion, and a male tube member having a distal end dimensioned to be received by the cup portion. As plurality of nibs that are spaced apart circumferentially are formed on the outer surface of the male member. The nibs extend radially outwardly so that the diameter of the male member defined by the distal ends of the nibs is greater than the diameter defined by the inner surface of the cup end portion.

The end portions of said members are telescoped and a rotational motion is imparted to the male member so that the nibs provide a locking groove that extends longitudinally and circumferentially in the inner surface of the cup portion. Finally, molten filler alloy is allowed to flow into said cup portion, and thereafter is solidified.

BRIEF DESCRIPTION OF THE DRAWINGS

FIG. 1 is a fragmentary perspective view of a heat exchanger embodying the present invention;

FIG. 2 is an elevational view showing one step of the present method;

FIG. 3 is an elevational view showing another step in the method;

FIG. 4 is an elevational view showing still another step in the method;

FIG. 9 is similar to FIG. 7 showing still another embodiment; and

FIG. 10 is a schematic view showing the joint area of the inverted assembly of FIG. 1 submerged in a molten solder bath.

DESCRIPTION OF THE PREFERRED METHOD

Figure 5:
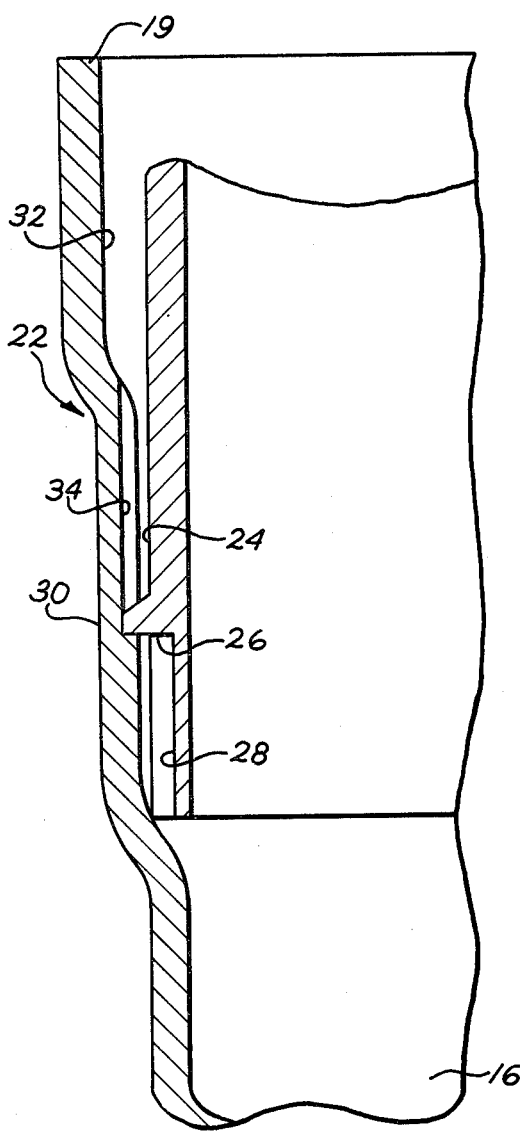
FIG. 5 is a sectional view taken along lines 5—5 of FIG. 4.

With reference to the drawings and more particularly FIG. 1, the invention is illustrated in connection with an aluminum tube-aluminum fin heat exchanger 10 of the type employed in refrigeration systems. The heat exchanger 10 includes end plates 12 and 14 for supporting tubing, which refrigerant tubing in the present instance is shown in the traditional serpentine arrangement. The serpentine arrangement is provided by a plurality of relatively long U-shaped tubular members 16. The open ends 19 of adjacent tubular U-shaped members are connected by shorter U-shaped or more commonly referred to return bend members 18.

The longer tubular members 16 are supported on the end plates 12 and 14. The shorter return bends 18 are secured as will be explained hereinafter to the open or free ends 19 of the longer members 18. Mounted on the longer tubular member 16 are a plurality of relatively thin fins 20 which function as heat transfer members. The fins 20 are closely spaced from each other as by collars (not shown) on the fins which are tightly fitted on the members 16. In a typical manufacturing process, the end plates 12, 14 and fins 20 are stacked, and the tubes 16 are inserted through appropriate openings (not shown) in the stacked plates 12, 14 and fins 20, with the free ends 19 thereof extending through the plate 12, following which the tubes 16 are expanded sufficiently to form a tight fit in the stack. Afterward, the heat exchanger assembly is completed as the return bends 18 are secured in place.

Figure 6:
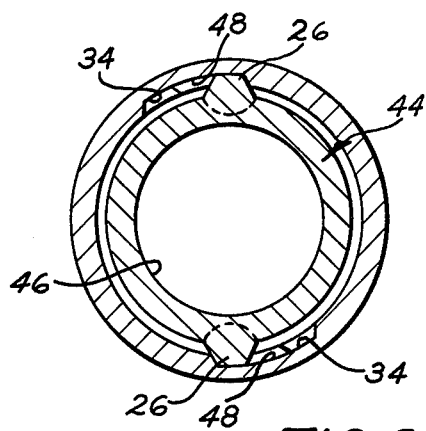
FIG. 6 is a sectional view taken along lines 6—6 of FIG. 4.

In order to appropriately join the short return bends 18 to the longer tube members 16 in fluid-tight telescopic joints, the free ends 19 of the tube section 16 which are to be joined to the return bends 18 are formed, as best illustrated in FIGS. 2-5, with an enlarged end portion, as at 22, adapted to telescopically secure therein an end portion 24 at the lower terminus of each return bend 18. As illustrated in FIGS. 5 and 6, each of the lower end portions 24 of the return bends 18 is formed with a plurality of angularly spaced nibs or projections 26.

The end portion 24 of the male members forming the joint is formed similar to that disclosed in U.S. Pat. No. 3,957,289. A longitudinally extending groove 28 in the outer surface of end portion 24 is formed extending in a direction away from the tube end, with the groove material thereby displaced forming a nib 26. The nibs 26 depending outwardly from the outer surface of the tube wall and disposed a predetermined distance from the ends of the tube 18. In the present instance, two grooves 28 and two resulting nibs 26 are formed at the ends of the male tube portion 24; however, more nibs can be provided if desired.

As is best shown in FIG. 5, the outer ends 19 of heat exchanger tube 16 include a tube cup portion 30 and a flared solder cup portion 32. The diameter of cup portion 30 is slightly larger than the outer diameter of the distal end of portion 24 to facilitate assembly, but the fit therebetween is sufficiently close to prevent a flow of solder when said end 24 of tube 18 is seated in cup portion 30. The diameter of cup portion 30 is made less than the corresponding distance between the outer extremities of two opposed nibs 26 so as to cause the nibs 26 to form a groove 34 on the inner surface of cup portion 30 when an end 22 of the tube member 18 is seated therein.

The end portion 24 of member 18 is thus adapted to be frictionally retained in the end portion 30 of member 16 while still leaving a substantial portion of the periphery of the end portion 24 spaced from the end portion 30 for permitting the flow of solder into the joint. This interference fit between both end portions 24 of return tube members 18 and cooperating portion 30 of adjacent tube members 16 and, more particularly, between the inner surface of portion 30 and the nibs 26, is sufficient, in most instances, to keep portion 24 of the return bends 18 in place relative to portion 30 of member 16 during the subsequent steps in the manufacture of the heat exchanger.

Figure 8:
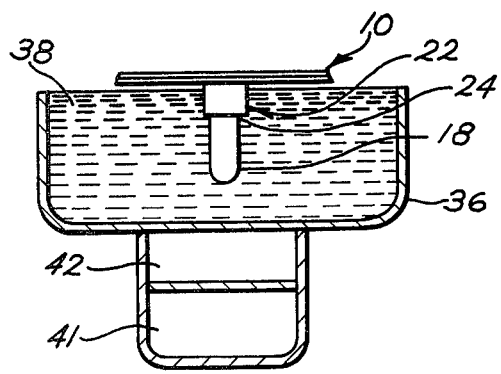
FIG. 8 is similar to FIG. 7 showing another embodiment.

After the return bends 18 are arranged on the tube member 16 in a preselected pattern that provides the desired refrigerant circuit the heat exchanger 10, as shown in FIG. 8, is inverted so that the return bends 18 are at the bottom. The end portion of the heat exchanger 10 including the portions 22 and 24 of members 16 and 18 respectively is then submerged in a solder pot 36 containing molten solder 38 or other alloy and which can be provided with an ultrasonic transducer 40 and horn 42. The joint may be sealed by other joining techniques and not necessarily limited to an ultrasonic soldering operation.

While the integrity of the telescoped joints of those members 18 that have nibs 26 formed at both ends secured to portion 30 of the heat exchanger 10 is maintained, it should be noted that some components or tube members to be joined to tube members 16 of heat exchanger 10, such as member 44 of FIG. 1, by design require that only one of its end portions be joined to portion 30 of the heat exchanger 10. In this instance, the nibs 26 are formed in only one end portion 46 of member 44 and a joint is made between that single end portion 46 of member 44 and a cooperating cup portion 30 of a member 16. Further, as shown, member 44 may extend beyond the outer extremity of heat exchanger 10 and accordingly be in a position to be subjected to hazards that could disturb the integrity of the aligned joints during the various handling operations which are involved in carrying out the steps necessary to complete the assembly of the heat exchanger 10. It is in the handling and moving of the heat exchanger that the parts fitted together can become dislodged prior to the soldering operation.

For example, in the present instance as shown, when member 44 extends beyond the dimension of the heat exchanger, it can be jarred either by being hit or, in the case where it is connected to a manifold 48, the leverage produced by the weight of the parts can cause displacement of its end portion 46 arranged in cup portion 30. The generally U-shaped configuration of members 44 is merely representative and it may in fact take other shapes.

Accordingly, by the present invention, a method is provided that will maintain the telescoped end portions 46 of member 44 and the cooperating cup portion 30 to be joined in their respective aligned positions.

Figure 7:
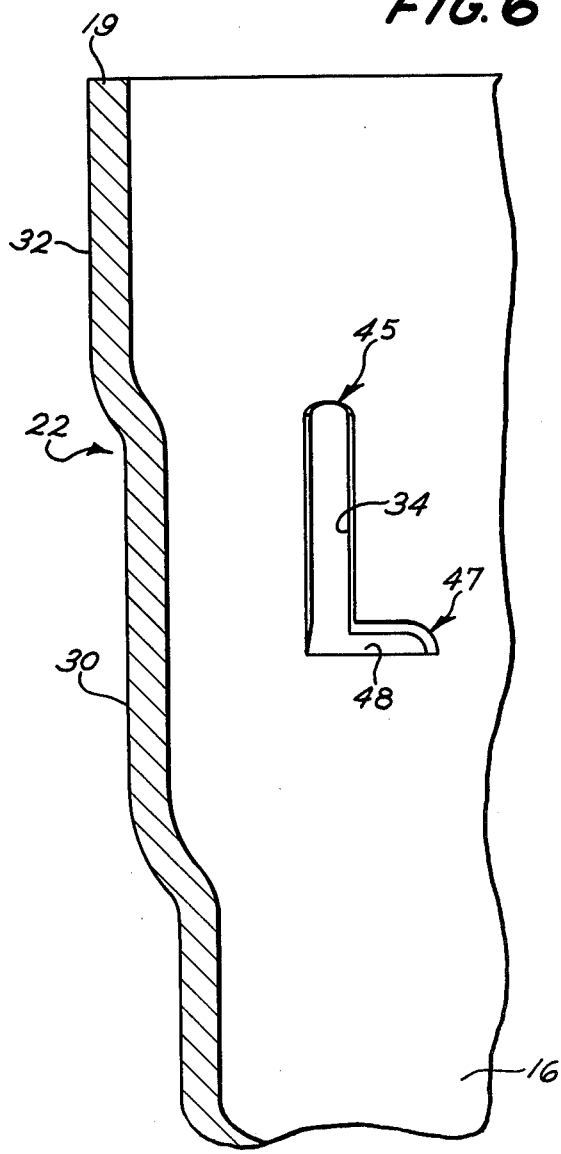
FIG. 7 is an enlarged fragmentary view showing one embodiment.

The member 44 generally shown as U-shaped in FIG. 1 may be arranged on heat exchanger 10 with its end portion 46 in an appropriate cup portion 22 after the soldering operation explained hereinbefore is completed. This is especially true when the member 44 is of a shape and size that it cannot be placed within the solder pot 36. In carrying out the present method of maintaining the member 44 in its position relative to the member 16, a locking groove is formed in the inner wall or surface of the cup portion 30. The exact configuration of the locking groove is not critical; however, it is necessary that it extend generally in a longitudinal and circumferential direction, as shown in FIG. 7, from a starting point 45 where the nibs 26 first start making the groove to a terminating point 47 where the nibs 26 stop in the completely telescoped members as arranged in FIG. 4. In one embodiment of the present method, after the end 46 of tube 44 is properly seated and located in cup portion 30, as is end portion 24 of member 18 as shown in FIG. 3, the tube member 44 is rotated so that a second or locking groove 48 (FIGS. 4, 6 and 7) is formed by the nibs 26 at an angle from the groove 40. In the present instance, it was found that a 15° rotation of the male member was adequate; however, other amounts of rotation may also be adequate. In effect, the nib 26 of member 44 is entrapped in groove 48 and the tube member 44 held against axial movement relative to the tube member 16.

In another embodiment, the locking groove indicated at 50 in FIG. 9 is formed by initiating the rotational movement by the male member 44 at the time it enters the cup portion 30 so that the locking groove 50 extends longitudinally and circumferentially in substantially a spiral or helix configuration. In still another embodiment, the locking groove indicated at 52 in FIG. 10 is formed by initiating the rotational movement of the male member 44 at some point after an initial longitudinal movement so that the locking portion 52 extends longitudinally and then as the telescoping action continues the groove extends therefrom in a longitudinal and circumferential direction. In summary, an effective locking groove arrangement can be effective in any path between the embodiment of FIG. 7 to that shown in FIG. 9.

Finally, the joint between end portion 46 of member 44 and its cooperating cup portion 22 is completed. This can be accomplished by placing the joint in a suitably sized solder pot or a filler material may be placed in the cup portion 32 in either an upright position in a molten state, or in a solid state followed by heating the material to a molten state.

It should be apparent to those skilled in the art that the embodiment described heretofore is considered to be the presently preferred form of this invention. In accordance with the patent statutes, changes may be made in the disclosed apparatus and the manner in which it is used without actually departing from the true spirit and scope of this invention.

I claim:

1. A method of joining metal tubes comprising:

providing a female metal tube member having a flared cup end portion;

providing a male metal tube member having an end portion dimensioned to be received by said cup portion and to seat against an inner surface of said flared cup portion;

forming a plurality of nibs spaced apart circumferentially on the outer surface of said male member and extending radially outwardly therefrom whereby the diameter of said male member defined by the distal ends of said nibs is greater than the diameter defined by the inner surface of said cup end portion, said nibs being spaced from said distal end, and also forming at least one groove on said outer surface extending longitudinally of said male member between said distal end and said nibs;

telescoping said tube members and inparting a rotational motion to said male member so that said nibs form a locking groove that extends longitudinally and circumferentially in the inner surface of said cup portion;

flowing molten filler alloy into said cup portion, and thereafter solidifying said alloy.

2. A method of joining metal tubes comprising:

providing a female metal tube member havng a flared cup end portion;

providing a male metal tube member having an end portion dimensioned to be received by said cup portion and to seat against an inner surface of said flared cup portion;

forming a plurality of nibs spaced apart circumferentially on the outer surface of said male member and extending radially outwardly therefrom whereby the diameter of said male member defined by the distal ends of said nibs is greater than the diameter defined by the inner surface of said cup end portion, said nibs being spaced from said distal end, and also forming at least one groove on said outer surface extending longitudinally of said male member between said distal end and said nibs;

moving the male member longitudinally into a partially telescoped position in said cup portion with said nibs forming a first longitudinal groove in the inner wall of said cup portion; then rotating said male member so that said nibs form a locking groove that extends longitudinally and circumferentially from said first longitudinal groove;

flowing molten filler alloy into said cup portion, and thereafter solidifying said alloy.

3. A method of joining metal tubes comprising:

providing a female metal tube member having a flared cup end portion;

providing a male metal tube member having an end portion dimensioned to be received by said cup portion and to seat against an inner surface of said flared cup portion;

forming a plurality of nibs spaced apart circumferentially on the outer surface of said male member and extending radially outwardly therefrom whereby the diameter of said male member defined by the distal ends of said nibs is greater than the diameter defined by the inner surface of said cup end portion, said nibs being spaced from said distal end, and also forming at least one groove on said outer surface extending longitudinally of said male member between said distal end and said nibs;

bringing said distal end into aligned telescoping engagement within said cup portion with said nibs forming a longitudinal groove in said cup end portion;

rotating said male member so that said nibs form a locking groove extending circumferentially at an angle from said longitudinal groove to prevent axial displacement of said male member relative to said female member through said longitudinal groove;

flowing molten filler alloy into said cup portion, and thereafter solidifying said alloy.

4. The method of claim 3 wherein said locking groove extends from said longitudinal groove circumferentially in a plane substantially perpendicular to the axis of said telescoped tube members.

5. The method of claim 4 wherein said male member is rotated circumferentially at least 15° from said longitudinal groove.

* * * * *